(12) United States Patent
Annunziato et al.

(10) Patent No.: US 8,078,181 B2
(45) Date of Patent: Dec. 13, 2011

(54) METHOD FOR PLANNING CELLULAR COMMUNICATION NETWORKS, CORRESPONDING NETWORK AND COMPUTER PROGRAM PRODUCT THEREFOR

(75) Inventors: Armando Annunziato, Turin (IT); Stefano Salio, Pino Torinese (IT); Stefano Giannini, Rome (IT)

(73) Assignee: Telecom Italia S.p.A., Milan (IT)

( * ) Notice: Subject to any disclaimer, the term of this patent is extended or adjusted under 35 U.S.C. 154(b) by 1359 days.

(21) Appl. No.: 10/566,677

(22) PCT Filed: Aug. 5, 2003

(86) PCT No.: PCT/EP03/08652
§ 371 (c)(1),
(2), (4) Date: Feb. 1, 2006

(87) PCT Pub. No.: WO2005/015936
PCT Pub. Date: Feb. 17, 2005

(65) Prior Publication Data
US 2006/0217120 A1    Sep. 28, 2006

(51) Int. Cl.
*H04Q 7/20* (2006.01)
(52) U.S. Cl. ........ 455/446; 455/423; 455/456; 455/452; 455/525; 455/447
(58) Field of Classification Search .................. 455/446, 455/67, 435, 456–456.3, 423–425, 447; 370/254
See application file for complete search history.

(56) References Cited

U.S. PATENT DOCUMENTS

| 5,987,328 | A | * | 11/1999 | Ephremides et al. | ......... 455/446 |
| 6,154,657 | A | * | 11/2000 | Grubeck et al. | ............ 455/456.2 |
| 6,336,035 | B1 | * | 1/2002 | Somoza et al. | ............... 455/446 |

(Continued)

FOREIGN PATENT DOCUMENTS
WO    WO-01/72071 A1    9/2001
(Continued)

OTHER PUBLICATIONS

Lepschy et al.; "Optimisation Problems in Mobile Networks Planning"; CSELT, Centro Studi E Laboratori Telecomunicazioni, Torino, Italy, pp. 2-16, (1998).

(Continued)

*Primary Examiner* — Charles Appiah
*Assistant Examiner* — Michael Vu
(74) *Attorney, Agent, or Firm* — Finnegan, Henderson, Farabow, Garrett & Dunner, L.L.P.

(57) ABSTRACT

In a method of planning cellular communication networks, at least one cost function indicative of the quality of service rendered by the network is defined which takes into account the quality of service of location-based services rendered by the network. That cost function is preferably based on the concept of dilution of precision and is indicative of the quality of service of voice services, data services and location based services jointly. A system is provided for measuring at least one actual network parameter. The measurements provided by the measurement system are compared with the corresponding parameters as planned with the purpose of locating at least one critical point in the network where inadequate quality of service is being provided. Information items indicative of counter measures to be carried out in the network in order to dispense with at least one critical point are provided. The cost function may be optimised by using as input data the location of at least one base station in the cellular communication network.

17 Claims, 9 Drawing Sheets

U.S. PATENT DOCUMENTS

Figure 1:
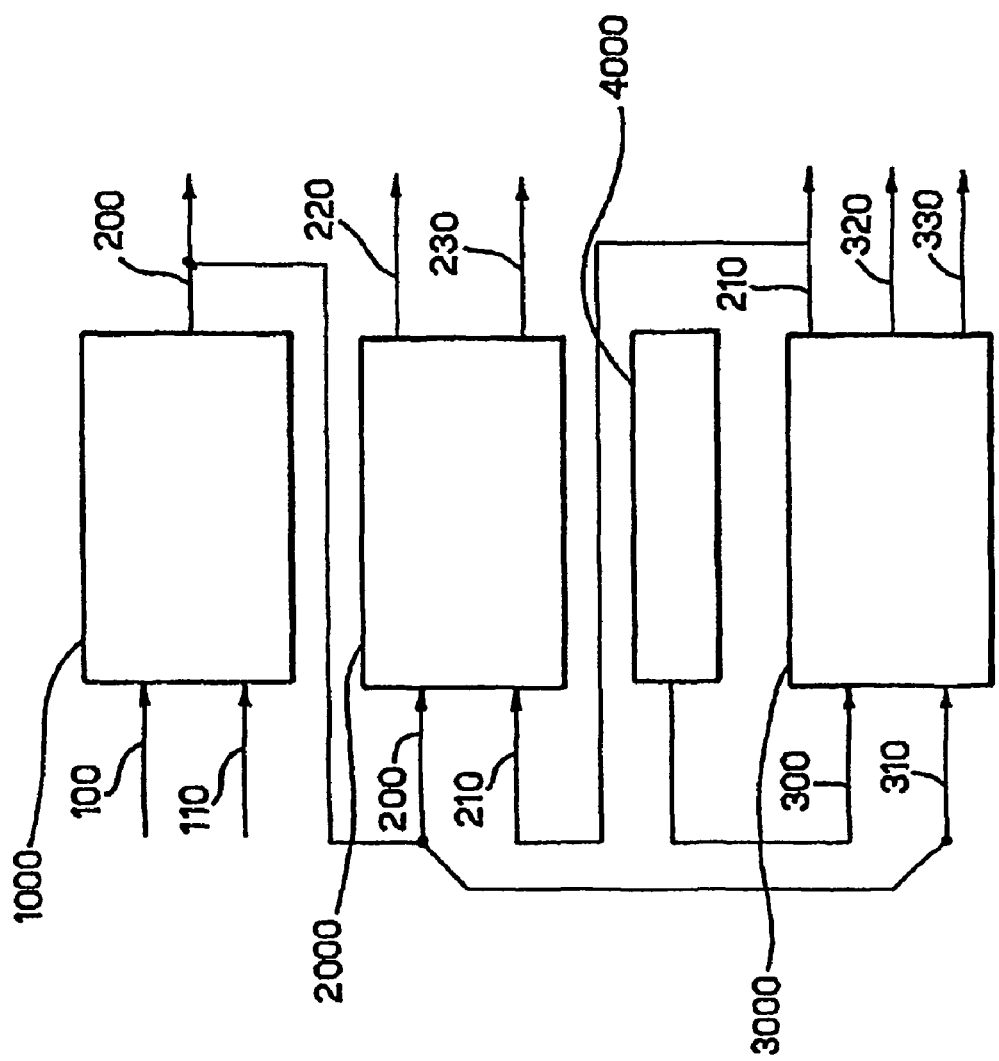

| | | | |
|---|---|---|---|
| 6,556,832 B1 | 4/2003 | Soliman | |
| 6,771,966 B1 * | 8/2004 | Chow | 455/446 |
| 6,829,491 B1 * | 12/2004 | Yea et al. | 455/560 |
| 6,836,467 B2 * | 12/2004 | Stanley | 370/254 |
| 7,295,960 B2 * | 11/2007 | Rappaport et al. | 703/13 |
| 7,596,373 B2 * | 9/2009 | McGregor et al. | 455/425 |
| 2002/0123354 A1 * | 9/2002 | Nowak | 455/456 |

FOREIGN PATENT DOCUMENTS

WO     WO-02/35872 A1     5/2002

OTHER PUBLICATIONS

"(3$^{rd}$ Generation Partnership Project; Technical Specification Group Radio Access Network; UE Radio Transmission and Reception (FDD)(Release 5)"; 3GPP TS 25.101, V5.6.0 Technical Specification; pp. 1-31, (2003).

Yarlagadda et al.; "Geometric Dilution of Precision (GDOP): Bounds and Properties"; 97CRD119, GE Research & Development Center, pp. 1-25, (1997).

* cited by examiner

METHOD FOR PLANNING CELLULAR COMMUNICATION NETWORKS, CORRESPONDING NETWORK AND COMPUTER PROGRAM PRODUCT THEREFOR

CROSS REFERENCE TO RELATED APPLICATION

This application is a national phase application based on PCT/EP2003/008652, filed Aug. 5, 2003, the content of which is incorporated herein by reference.

FIELD OF THE INVENTION

The present invention relates to techniques for planning cellular communication networks such as mobile communication networks.

DESCRIPTION OF THE RELATED ART

A number of solutions have been devised in the prior art with the aim of defining an optimal configuration for a cellular communication network.

Essentially, such prior art techniques aim at defining an optimum or nearly-optimum network configuration in order to achieve a maximum degree of quality of service (QoS), by paying specific attention to voice and data services within a given area.

Exemplary of such prior art arrangements are those disclosed in WO-A-01/72071 and WO-A-02/35872.

The arrangement disclosed in WO-A-01/72071 is essentially a method that optimises the dimensions and shapes of the cells in a given area on the basis of certain parameters (e.g. received power, signal-to-noise ratio, traffic capability, bit error rate) assumed that the locations of the base stations (SRB) are provided. The locations of the various base stations represent input data and do not come into play in the planning process intended to maximise the grade of service (GOS) of voice and data services.

The arrangement of WO-A-02/35872 is intended to optimise mobile networks based on a Code Division Multiple Access (CDMA). This goal is achieved by ensuring cell planning by means of real or realistic data in order to obtain, at each step in the process, results that are reasonably close to the final ones. The whole planning process optimises the network nodes configuration in terms of fitting the above mentioned parameters values (e.g. received power, signal-to-noise ratio, etc.) by paying specific attention to the quality of voice and data services. The planning process does not take into account location services, or topology criteria for defining the optimum mutual positioning of the network apparatuses within a given area.

To sum up, prior art systems and/or methods for planning cellular mobile networks aim at achieving an optimal configuration of network apparatuses within a given area by paying attention to the voice and data services only. The planning process evaluates parameters such as:

- the radio parameters—e.g. Signal-to-Noise Ratio (SNR), Channel-to-Interference ratio (C/I), Bit Error Rate (BER),
- those parameters related to the intrinsic features of the radio system—e.g. traffic capability, macro diversity for UMTS (Universal Mobile Telecommunication System) networks,
- those parameters related to the occasions of buildings and streets—so-called "urbanisation", and
- those parameters related to the territory morphology.

As indicated, in such arrangements the location of the base stations represents input data and thus do not come into play in the planning process directed at optimising the quality of voice and data services.

OBJECT AND SUMMARY OF THE INVENTION

Applicant has found that a need exists for improved solutions that may permit a cellular communications networks to be-optimised by taking into account the vast majority of (and notionally all) the services offered by the network by paying specific attention to location based services.

In particular, the present invention pays specific attention to any service directly or indirectly connected to the use of the network for locating mobile terminals and hereinafter defined as a location based service.

Additionally, the need is felt for arrangements that may involve a sort of feedback process in cellular network deployment. This should preferably be done by introducing the capability of locating areas (or sub-areas) that may be regarded as critical in terms of worsening the quality of certain services such as location services.

The object of the present invention is thus to provide an improved arrangement satisfying those needs.

According to the invention, such an object is achieved by means of a method having the features set forth in the claims that follows. The invention also relates to a corresponding communication network including at least one processing module for implementing the method of the invention as well as a computer program product loadable in the memory of at least one computer and including software code portions for performing the steps of the method of the invention when the product is run on a computer.

In brief, the arrangement disclosed herein extends the concept of cellular network planning also to location services.

The arrangement disclosed herein is based on the optimisation of parameters that, in addition to the radioelectric, urbanization and other parameters related to cell dimensions and shapes also takes into account topological criteria such as the location or position of the network apparatuses and their mutual positioning (i.e. topology aspects as highlighted in the following).

Additionally, the arrangement disclosed herein optimises the planning process by ensuring a pre-defined level of quality of service (QoS) by jointly taking into account voice services, data services (fax, web, and so on) as well as so-called Location Based Services (LBS).

Furthermore, the arrangement disclosed herein provides for a feedback action to take place within the deployment process with a view to optimising the final results. Preferably, the arrangement disclosed herein is adapted to identify within the network certain "critical" areas or sub-areas within the network (that is areas/sub-areas that are appreciably misaligned with respect to the network design) thereby permitting optimal deployment and configuration of the mobile network apparatuses within a given area.

In a preferred embodiment of the arrangement disclosed herein, planning of the cellular network is based on radio parameters as well as parameters that are typical of the type of network in use (for instance macro diversity in the case of UTMS networks). Planning does not merely involve voice and data services but, additionally, also location services; this is preferably done by optimising the network topology by a method based on the formulation of dilution of precision (DOP) that is extended to all types of wireless networks.

As known, DOP is a measure of the strength or confidence factor in the accuracy of the position solution of objects, that measure having lower values when the confidence factor is greater.

For a general introduction to the formulation or concept of DOP reference can be made to: R. Yarlagadda, I. Ali, N. Al-Dhahir, S. Hersheg "Geometric Dilution of Precision (DOP): Bounds and Properties"—Technical Information series, 97CR119, August 1997.

In contrast to prior art arrangements, the arrangement disclosed herein preferably optimises the mobile network jointly for all of the voice, data and location services.

A preferred embodiment of the invention is based on an analysis process based on an initial layout of the network planning and a plurality of measurements effected "in the field" in order to define the misalignment of the actual data with respect to the design data. The analysis process leads to specific actions being proposed in order to maximise the quality of services. In fact, the arrangement disclosed herein preferably introduces a feedback action within the deployment process adapted to optimise location services in the areas involved by the planning process.

BRIEF DESCRIPTION OF THE ANNEXED DRAWINGS

Figure 2:
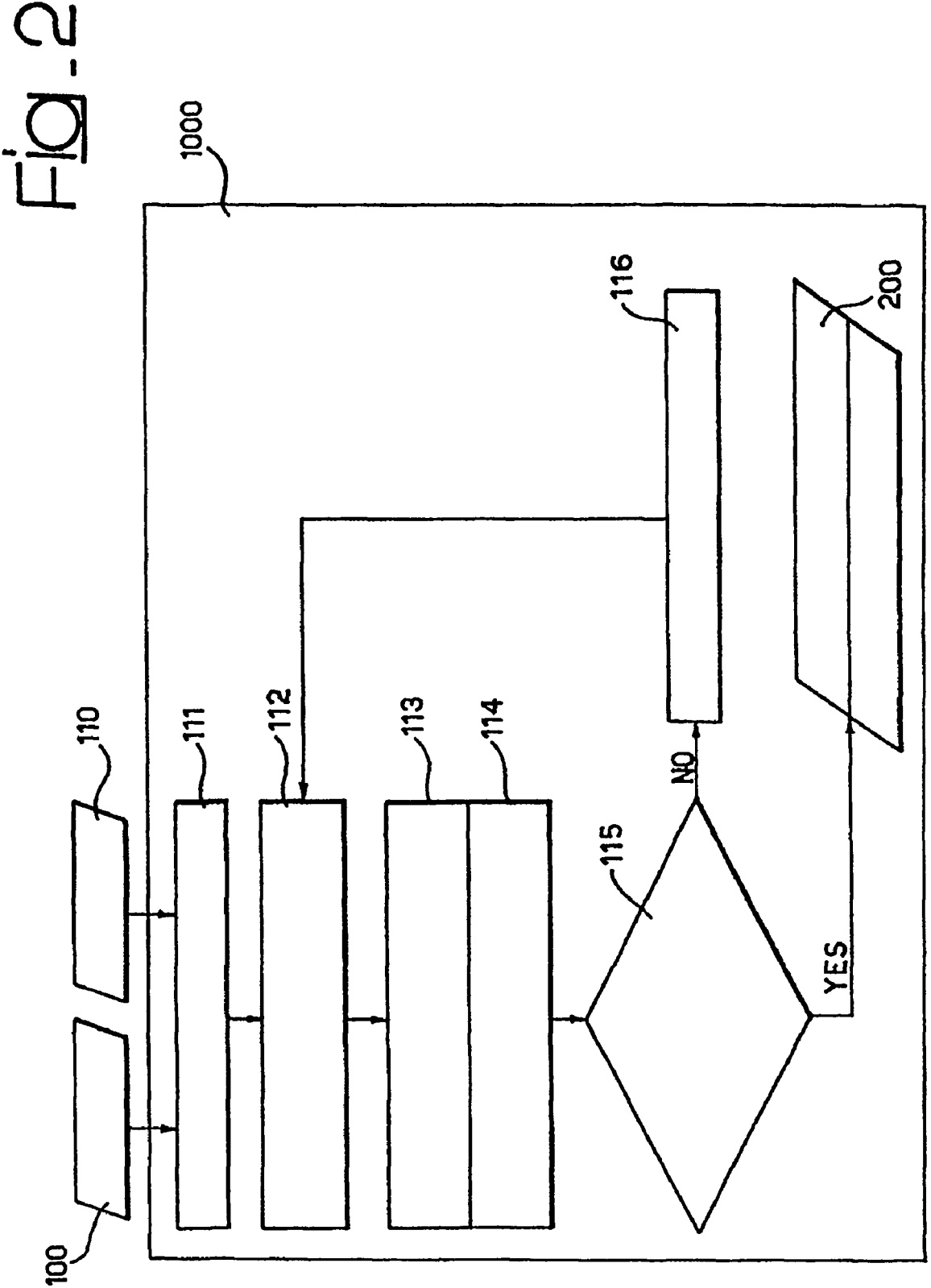
Figure 3:
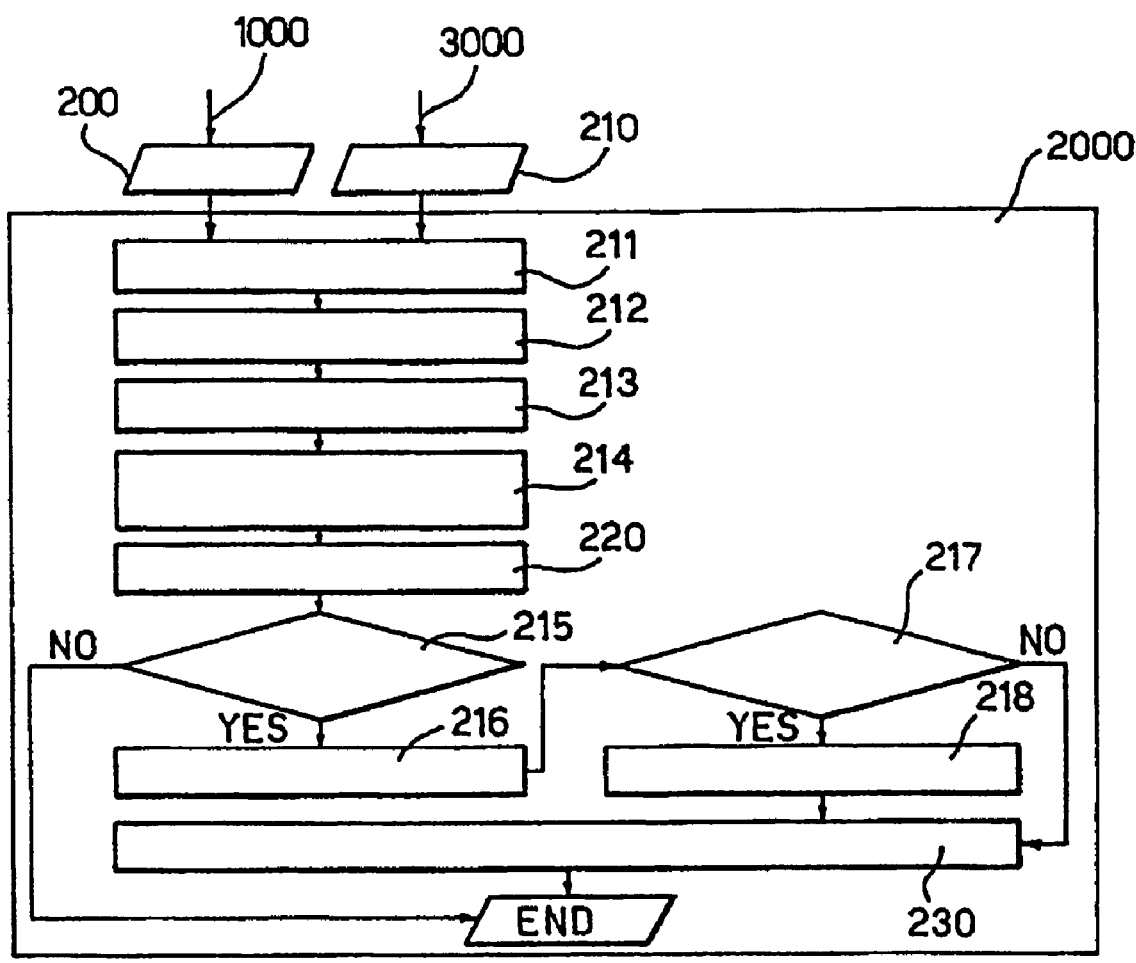
Figure 4:
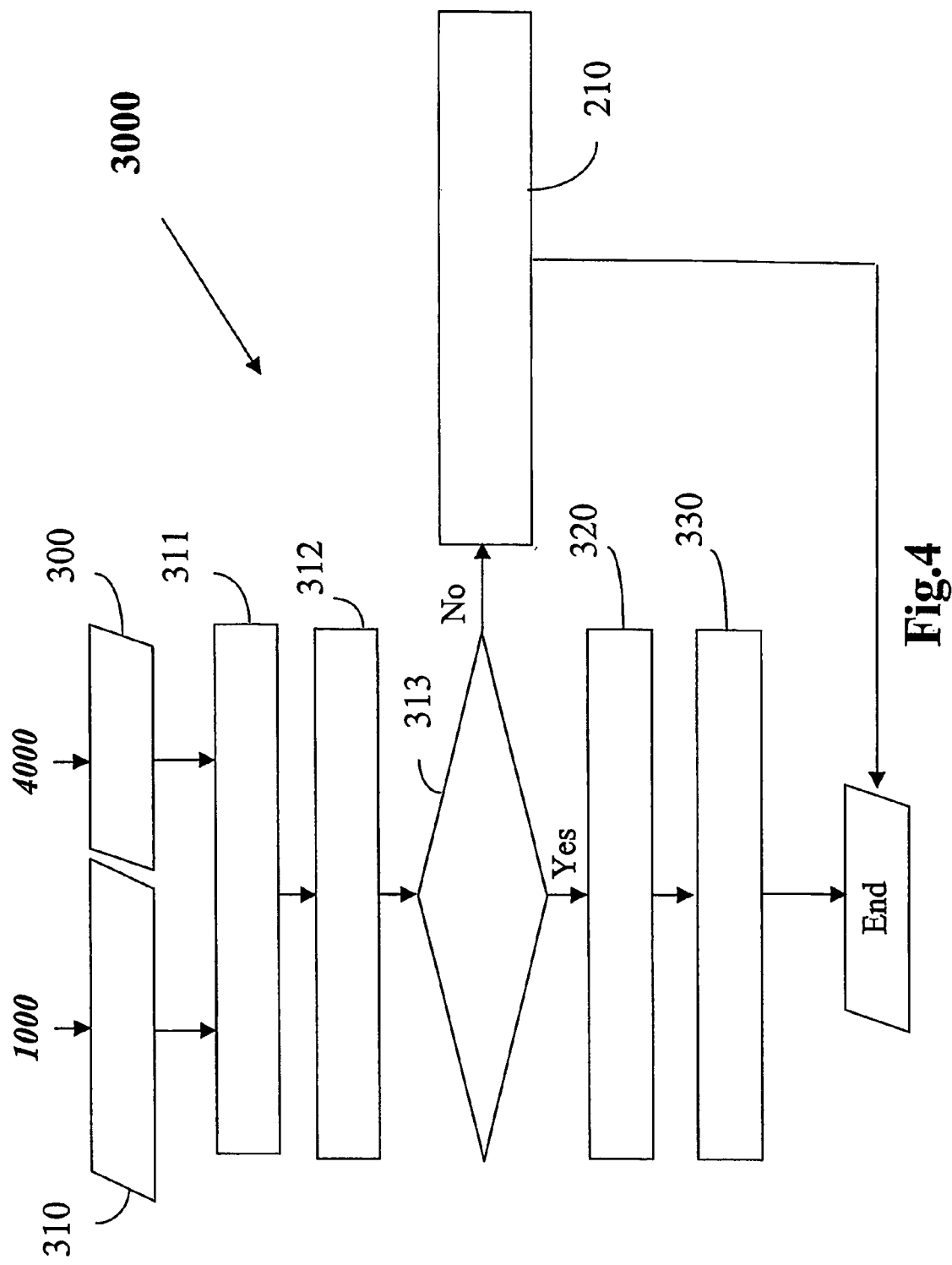
Figure 5:
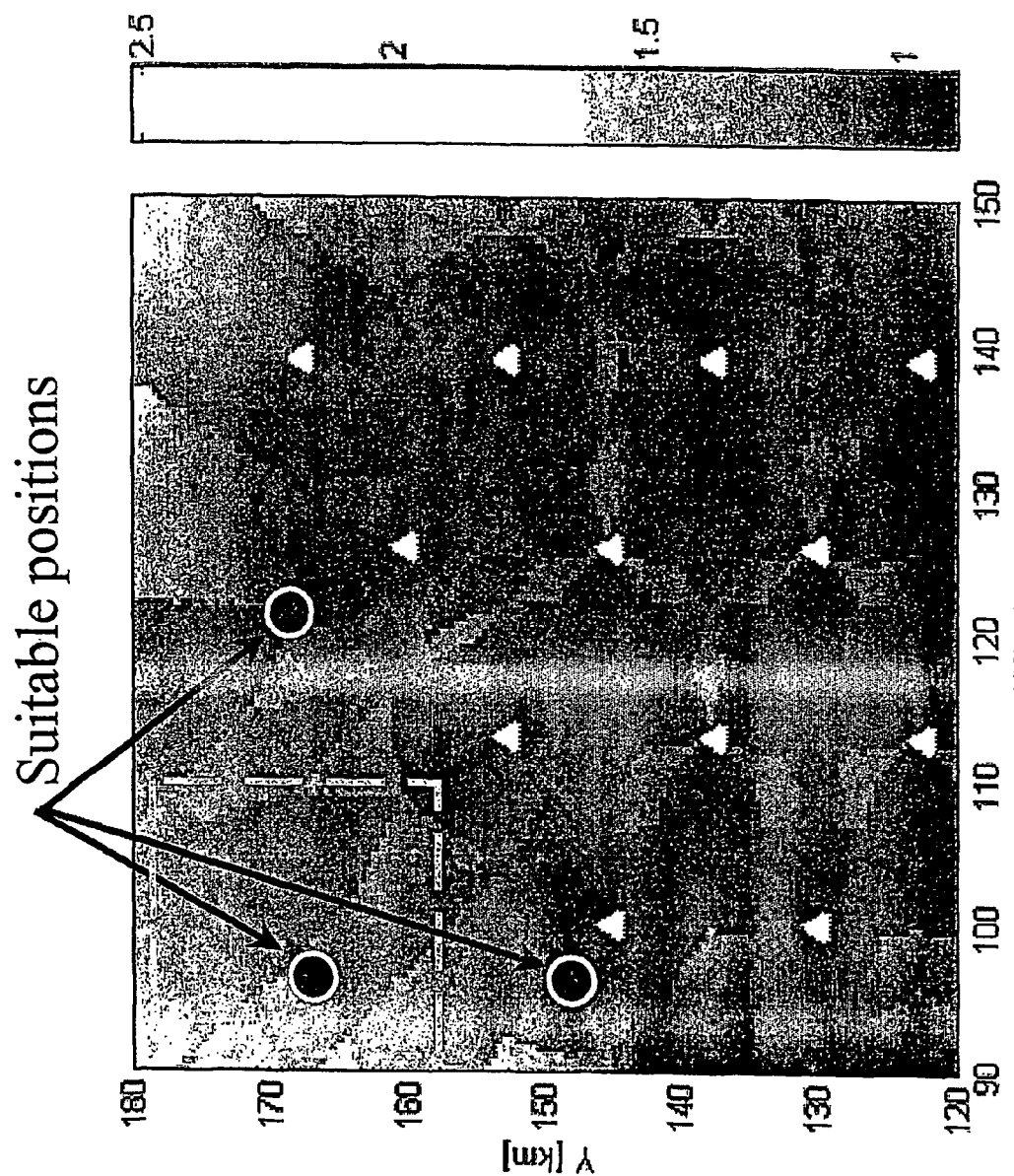
Figure 6:
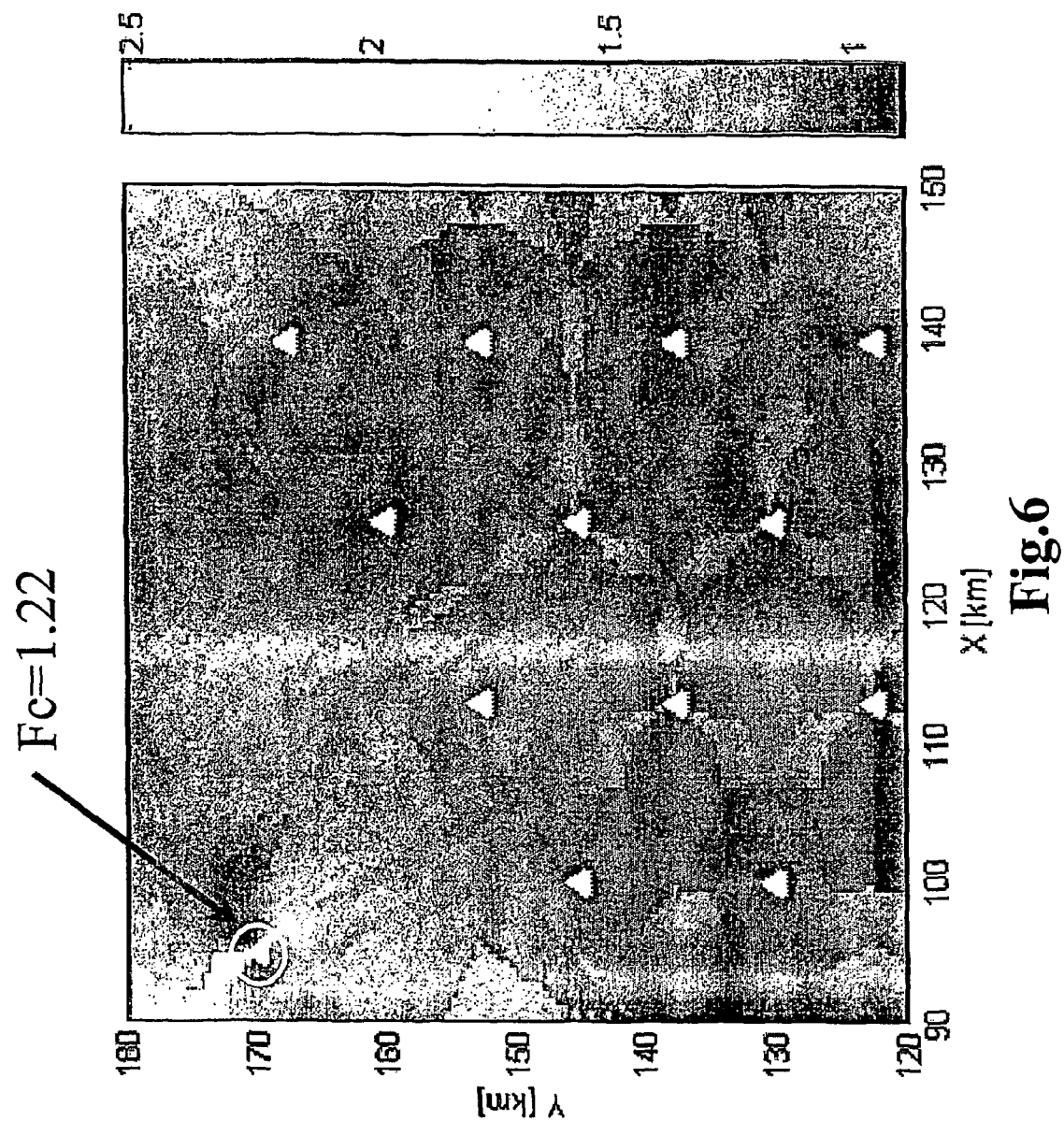
Figure 7:
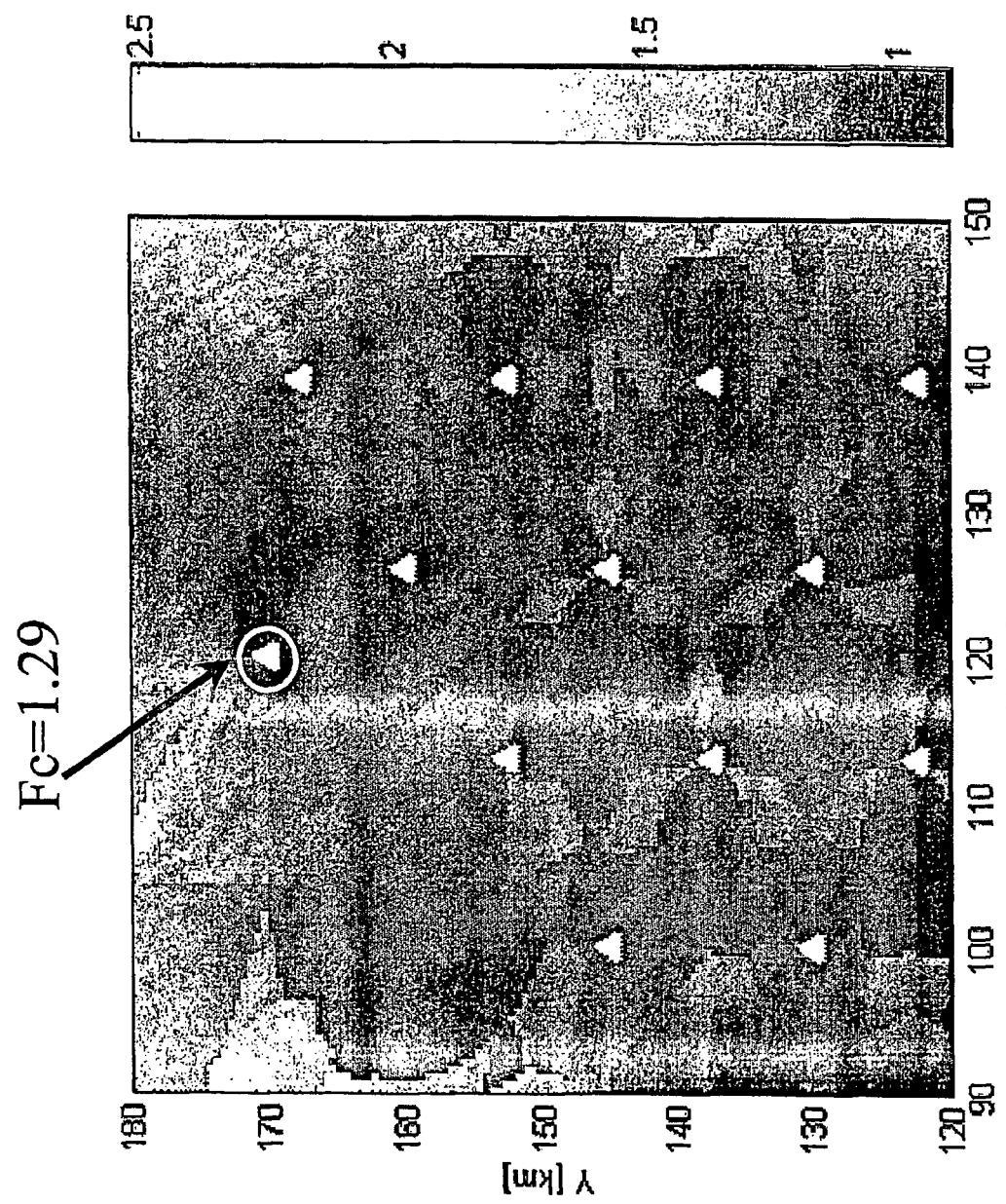
Figure 8:
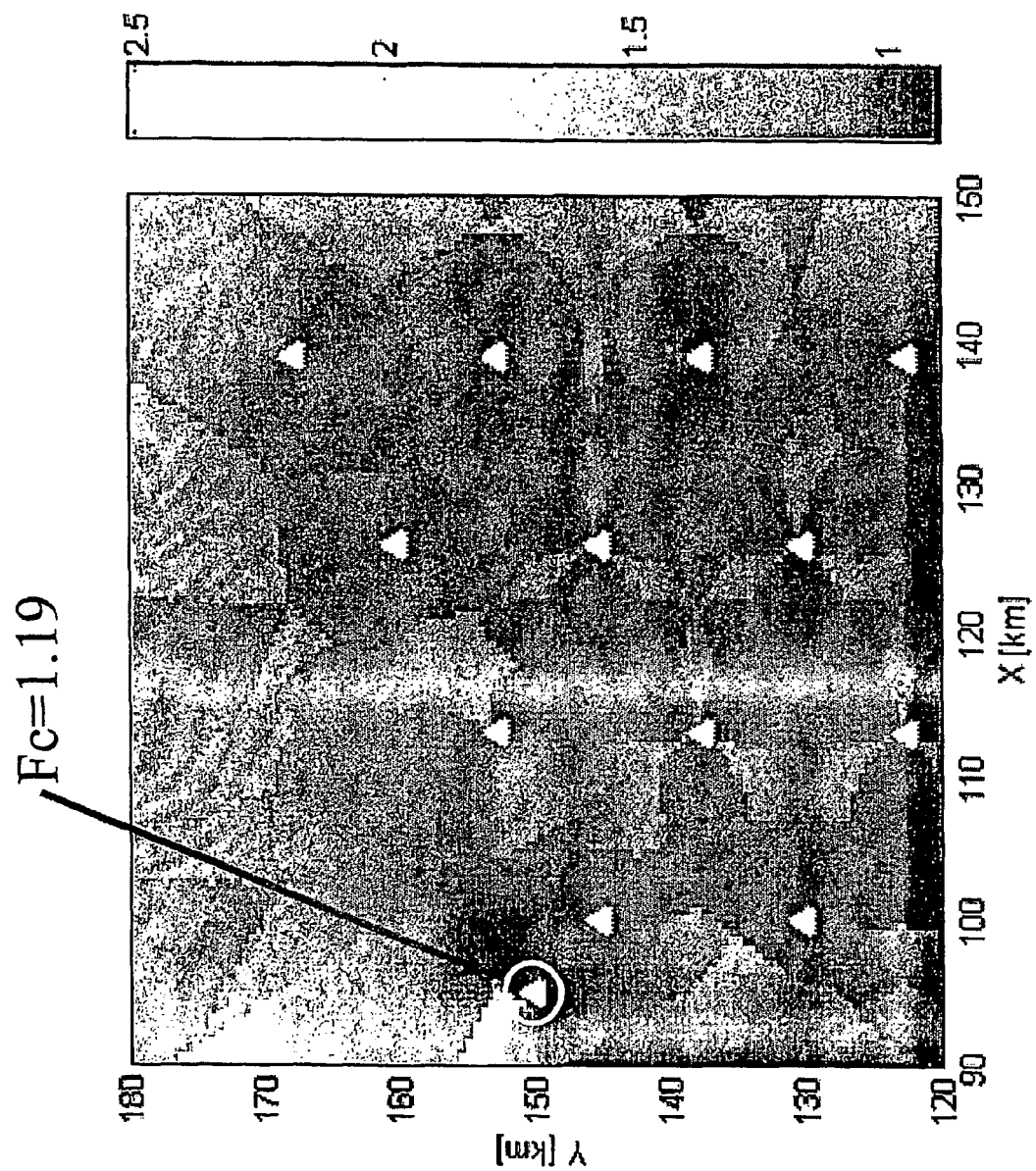
Figure 9:
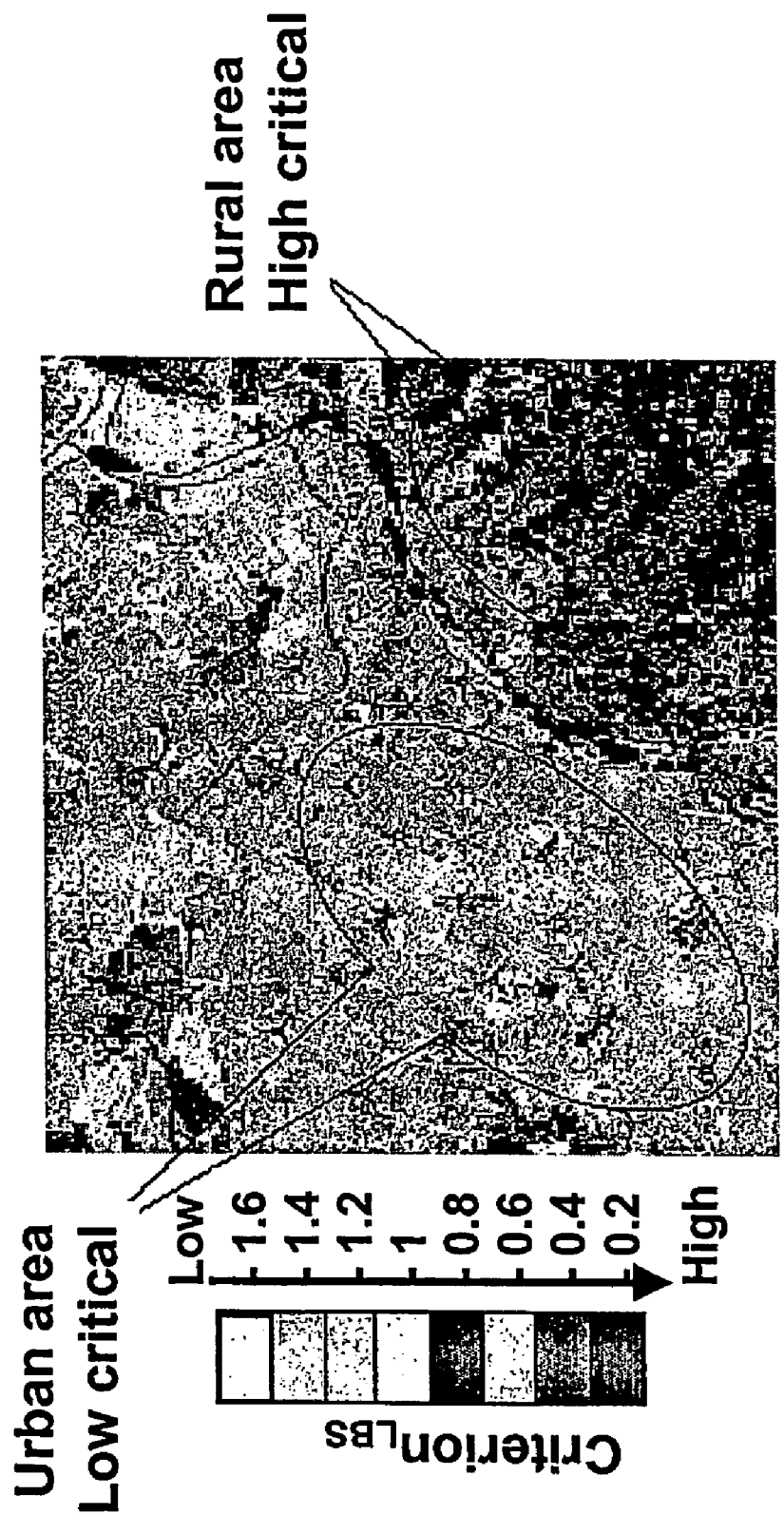

The invention will now be described, by way of example only, by referring to the annexed figures of drawing, wherein:

FIG. 1 is a functional diagram showing the overall layout of an arrangement described herein, FIG. 2 is a flow chart of a first set of steps included in a method as disclosed herein, FIG. 3 is another flow chart showing a second set of steps included in the method disclosed herein, and FIG. 4 is still another flow chart representing a preferred development of the arrangement disclosed herein, FIGS. 5 to 8 draw the final (FIG. 8) and intermediate (FIGS. 5-7) results of the joint planning process according to present invention, FIG. 9 draws by means of a map areas highlighted as critical in the deployment process according to present invention.

DETAILED DESCRIPTION OF PREFERRED EMBODIMENTS OF THE INVENTION

As already indicated in the foregoing, the arrangement disclosed herein includes a system that allows planning of a mobile network apparatus to be carried out over a given area by optimising the joint quality of service (QoS) of a number of services.

As disclosed herein, the planning process involves defining the location of antennas or radiating systems included in the network infrastructure, that are typically associated to, or even adjacent to, the Radio Base Stations (RBS) or, generally, Base Transceiver Station (BTS) for a GSM (Global System for Mobile communications) mobile telecommunication network or B nodes in an UMTS mobile telecommunication network).

By "joint" quality of service, quality of service is meant as applying in general to voice, data and location services. Such an optimisation activity also permits to check the correctness of network design by pointing out specific corrections and interventions possibly required.

As schematically shown in FIG. 1, a preferred embodiment of the arrangement disclosed herein includes:

a first module 1000 adapted to receive network data 100 as well as additional data 110, and including cellular planning tools (for voice, data and location based services—LBS); the output of the module 1000, generally designated 200, is essentially comprised of a planning project for voice, data and location based services;

a second module 2000 adapted to receive the output data 200 of the first module 1000 as well as additional data 210 to be better detailed in the following; the module 2000 is essentially comprised of tools for analysing the network deployment and generate therefrom information items 220 that identify "critical" points in the network that require interventions in order to improve the quality of service (QoS) especially in connection with location based services: the specific countermeasures to be carried out in the network are defined as information items designated 230;

a third module 3000 adapted to receive network measurements 300 specifically related to actual measurements carried out in the network as well as additional data 310; the module 3000 is intended to operate as a remote deployment module to generate a prevalidated measurement data 210 that are input to the module 2000 as well as information items 320 concerning the local synthesis of the critical points in the network (primarily in connection with LBS) and information items 330 identifying countermeasures to be carried out in the local network, and a fourth module 4000 essentially comprised of a measurement system for the network parameters intended to generate the measurement signals 300 fed into the module 3000.

FIGS. 2, 3, and 4 detail the structures of modules 1000, 2000 and 3000. A detailed description of the measurement module 4000 is not necessary herein insofar as such a measurement module is to be regarded as known per se.

The cellular planning module 1000 as shown in FIG. 2 is essentially based on an arrangement already known in the art for use in network design related to the voice and data services (e.g. WO-A-02/35872).

The arrangement disclosed herein introduces a new planning process for location services that is based, in addition to those network parameters 100 already considered in the foregoing (namely radio parameters, system characteristics, urbanization parameters, territory morphology and so on) also the network topology information designated 110. This occurs preferably by means of both linear and non-linear functions referred to the concept of dilution of precision (DOP).

Specifically, the cellular planning process is of an iterative type and aims at maximising at each step a cost function characterised by merit functions for voice, data and location services generally defined as $$F_{Cost} = F[f_{Cost}(\text{voice}), f_{Cost}(\text{data}), f_{Cost}(\text{location})] \quad (1)$$

From now on as a cost function will be considered any function that point out a merit value (e.g. QoS) as some combination of other related parameters.

A cost function as expressed in the formula above can be defined in the case of LBS once the related DOP parameters are correctly related thereto.

Consequently, the arrangement disclosed herein introduces a cellular planning process for location services and produces as a result (designated 200) an optimum planning of voice, data and location services for any type of mobile network.

The arrangement disclosed herein also checks that the network design is already complied with during actual deployment of the network. To that end the analysis module 2000 that takes care of synthesis of the network design (see FIG. 3) proceeds by processing the network design data 200 and those measurements 210 that are carried out on the network by means of the measurement sub-system designated 4000.

The arrangement disclosed herein provides an indication (under 220) of those critical areas where location services cannot be offered due to the insufficient quality of service and also (under 230) the countermeasures to be effected in the network in order to re-establish a given value of quality of service as desired by the network operator.

The module 2000 as shown in FIG. 3 preferably cooperates with the module 3000; this latter module acting as a remote unit that implements a part of the processes on a territory sub-set. This has the purpose of offering the end-to-end functions of the whole system by introducing the concept of mobility over the territory where the mobile network apparatus have been deployed according to the network design.

By processing a subset of the network design data 310 (FIG. 4) together with the measurements 300 performed on the network by means of the measurements module 4000 the module designated 3000 provides an indication of the critical areas for offering location services with a given quality of service over a certain portion of the territory (see FIG. 4 under 320) and the counter-measures to be carried on the network apparatus (FIG. 4 under 330) while also possibly sending pre-validated measurements to the module 2000 (210).

The three modules above described should be resided in workstations or, generally, servers in order to have at least one central computer system comprising modules 1000 and 2000 and one remote computer system comprising the module 3000. Communication among the various computer systems considered herein in terms of network (e.g. Public Swiched Telephone Network—PSTN, Integrated Service Digital Network—ISDN, Asymmetric Digital Subscriber Line—ADSL, GSM, General Packet Radio Service—GPRS, UMTS, Wireless Local Area Network—WLAN and so on) and protocols (e.g. Transmission Control Protocol/Internet Protocol—TCP/IP, Hyper Text Transfer Protocol—HTTP, File Transfer Protocol—FTP, TELNET, Wireless Application Protocol—WAP) takes place according to standard arrangements of the prior art thereby making it unnecessary to provide a detailed description herein.

In more closely investigating the arrangement disclosed herein, it will be assumed with reference with FIG. 1 that the various apparatuses included in a mobile network are intended to be deployed over a given territory or area while investigating the respective effects on the quality of service (QoS) in voice, data and location services.

For that reason specific cost functions for voice and data services are introduced as represented by the formulas 2 and 3 reported hereinbelow:

$$f_{CostV+D} = f\left(\text{Power, SNR}, \frac{C}{I}\text{BER, Capacity, Macrodiversity}\right) \quad (2)$$

$$f_{CostV+D} = f(\text{Urbanization, Morfology}) \quad (3)$$

Additionally, a new cost function is added for location services as per the formula designated 4 that makes use of the concept of dilution of precision (DOP) that has been already used in other areas.

$$f_{CostLBS} = f(\text{Topology}) \quad (4)$$

Topology parameters take into account the own location of the network apparatuses and their mutual positioning.

In actual fact, only optimising formula (1) introduced in the foregoing leads to an optimal deployment of the apparatuses in a mobile network (for instance the antennas of the B nodes for a UMTS network) by jointly optimising the quality of the three services mentioned.

The optimum of function (1) can be searched by means of iterative processes e.g. by means of a minimum search process or by setting a threshold on the function value or the maximum number of iterations allowed.

A suitable formula (1) could be expressed as:

$$F_{cost} = AF_{cost}(\text{Voice}) + BF_{cost}(\text{Data}) + CF_{cost}(\text{LBS}) \quad (5)$$

$F_{cost}$(voice) and $F_{cost}$(data) can be assumed to be known by known documents (e.g. by public document "Optimisation Problems in Mobile Network Planning"—LEPSHY, MENOLASCINO, MINERVA—CSELT 18-12-1998); by using the $F_{cost}$(LBS) described ahead (15), the process optimises the formula (5) for instance by solving the equation that minimised the cost functions defined by the formula (1) above.

A, B and C are variable coefficients related to the quality of service desired. A, B and C allow to more or less emphasize one of the $F_{cost}$ factors in formula 5 with respect to the others (for instance, to emphasize the voice and data services, A and B could assume values 10 (ten) and 5 (five), respectively, and C the unitary value (one)).

The arrangement disclosed herein provides an optimal use of a module as shown in FIG. 1 under 2000 that, by jointly analysing the network design and the measurements actually carried out on the network by means of an external measurements system such as the module designated 4000, identifies the critical areas within the network where the quality of location services becomes critical while also suggesting countermeasures to be adopted in order to lead the quality of service to the desired values. For instance in the case of LBS and of the DOP criteria, one could consider an area as critical when the DOP assumes values from 10 (ten) on (i.e. assuming a root mean square—r.m.s.—of the positioning error equal to 50 meters and a DOP equal to 10, then positioning accuracy becomes equal to (50×10) 500 meters); in the case of voice service instead and by the BER criteria one could point out critical area while the BER values are between $10^{-1}$ and $10^{-2}$ (that means an errored bit over 10 or 100 bits).

The process providing the information on the critical areas in the network calculates the effects of any variations in the network parameters (for instance azimuth, tilt, synchronization loss, and so on) on the accuracy of location with respect to the network design as indicated by 200 in FIG. 1. The radio models or propagation models adopted, that depend on the operating scenarios (for instance urban, suburban, rural, and so on), are known in the art and do not require a detailed description herein (3GPP TS 25.101 V5.6.0, "3rd Generation Partnership Project; Technical Specification Group Radio Access Network; UE Radio Transmission and Reception (FDD)—Release 5", Annex B—propagation conditions).

Additionally, the arrangement disclosed herein provides for the optimal use of the remote computer system via the module 3000 that, by jointly analysing a portion of the network design and the measurements carried out on the corresponding sub-network by the module 4000, identifies critical areas in the network, namely those areas where location services cannot be provided with the desired level of quality of service. Additionally, the module 3000 suggests countermeasures that may be adopted in the network to bring the quality of service back to the desired value and gives back to the module 2000 pre-validated measurements in view of processing over the whole network.

In the following, a preferred embodiment of the module 1000 will be described in greater detail in connection with a UMTS network. Specifically the issue will be considered by way of example of planning the addition of a new radio base station (a so-called Node B for the UMTS network) and associated antenna or radiating system to the pre-existing network.

By referring to FIG. 2 at the i-th step the following input to the module can be identified:
- the network data 100 concerning the base station to be added (that is the power transmitted by the new Node B, the antenna type, the radiation diagram, the Node B location, data concerning traffic expected in a given area and so on), and
- additional data 110 including the boundaries of the area covered by the design, its morphology, its degree of urbanization and so on.

The pre-existing network design can be regarded both as additional data and as network data without any change in the validity of the description.

Cellular network planning is carried out in order to maximise jointly the quality of all the services namely voice services, data services and location services as provided by the network. Such an optimisation action is obtained by means of the following functional blocks.

A first block 111 subdivides the area covered by the planning process into sub-areas. One of these sub-areas will correspond to the destination area of the new base station, while the remaining sub-areas will be characterised by the effects due to the introduction of the new base station. Exemplary for this is e.g. an increase in the adjacent channel interference C/I.

Another block 112 performs (according to principles that are known in the art e.g. by WO-A-02/35872) planning of the sub-area that should host the additional base station by computing the effects on the adjacent areas. It will be appreciated that the location data of the new base station (latitude, longitude, altitude) represent input data to the process.

In a further block 113 proper cellular planning is introduced. Here the topological aspects of the area subject to planning are taken into account. In practice, a DOP value is computed for all the pixels in the area subject to planning.

This is done on the basis of the standard formulation of the concept of DOP as described in the paper by R. Yarlagadda et al. already cited in the foregoing.

In the instant case a formulation of DOP was adopted that is suitable for planning mobile communication networks by making specific reference to location method based on the measurement of absolute distances between the base station and the mobile terminal according to following formulas 6 to 14.

The explanation provided in the following is not applicable to those location methods based on the measurement of distance differences such as, for instance, Observed Time Differences (OTD) measurements. Of course, a corresponding formulation of the concept of DOP can be devised also for those different kind of measurements.

A location scenario will now be considered characterised by a system of orthogonal axes X, Y, Z wherein:
- N base stations are provided located at $x_1, y_1, z_1, \ldots, x_N, y_N, z_N$, and
- a Mobile Station (MS) located at $(x, y, z)$.

The distance between the mobile terminal MS and the i-th Node B (usually referred to as "Absolute Range") is given by:

$$R_i = \sqrt{(x-x_i)^2 + (y-y_i)^2 + (z-z_i)^2} \quad i=1,\ldots,N \quad (6)$$

By assuming that the accuracy of location is to be analysed as a function of the accuracy in determining absolute range (namely the accuracy of x, y, z as a function of $R_i$), the preceding formula is linearised as follows:

$$\Delta R = \begin{bmatrix} \Delta R_1 \\ \vdots \\ \Delta R_N \end{bmatrix} = \underline{H} \begin{bmatrix} \Delta x \\ \Delta y \\ \Delta z \end{bmatrix} = \begin{bmatrix} \frac{\partial R_1}{\partial x} & \frac{\partial R_1}{\partial y} & \frac{\partial R_1}{\partial z} \\ \vdots & \vdots & \vdots \\ \frac{\partial R_N}{\partial x} & \frac{\partial R_N}{\partial y} & \frac{\partial R_N}{\partial z} \end{bmatrix} \begin{bmatrix} \Delta x \\ \Delta y \\ \Delta z \end{bmatrix} \quad (7)$$

where $\Delta R_1, \ldots, \Delta R_N$ represent the inaccuracy in measuring the absolute ranges, while $\Delta x, \Delta y, \Delta z$ represent the location inaccuracy. The matrix $\underline{H}$ of the partial derivatives can be easily computed, e.g.:

$$\frac{\partial R_1}{\partial x} = \frac{x - x_i}{\sqrt{(x-x_i)^2 + (y-y_i)^2 + (z-z_i)^2}} \quad (8)$$

$\Delta R_1, \ldots \Delta R_N$ are assumed to be independent Gaussian processes with zero mean value and variance that is identical for all the processes and equal to $\sigma_R^2$.

According to the estimation known in the technical literature as Best Linear Unbiased Estimate (BLUE), $\Delta x$, $\Delta y$ and $\Delta z$ are the realisations of a zero-average Gaussian process with a variance equal to:

$$\begin{bmatrix} \mathrm{var}(\Delta x) & 0 & 0 \\ \cdots & \mathrm{var}(\Delta y) & 0 \\ \cdots & \cdots & \mathrm{var}(\Delta z) \end{bmatrix} = diag\{\underline{H}^T \underline{Q}^{-1} \underline{H}\}^{-1} \quad (9)$$

where $\underline{Q}$ is the covariance matrix of $\underline{\Delta R}$ that, as is known, is equal to:

$$cov\{\underline{\Delta R}\} = E\{\underline{\Delta R} \cdot \underline{\Delta R}^T\} = E\left\{\begin{bmatrix} \Delta R_t \Delta R_t & & \Delta R_t \Delta R_N \\ & \ddots & \vdots \\ \Delta R_N \Delta R_t & \cdots & \Delta R_N \Delta R_N \end{bmatrix}\right\} \quad (10)$$

Since $\Delta R_1, \ldots, \Delta R_N$ are independent Gaussian processes then $E\{\Delta R_i \cdot \Delta R_j\} = 0$ if $i \neq j$ while $E\{\Delta R_i \cdot \Delta R_j\} = \sigma_R^2$ if $i=j$. Consequently, $$cov\{\underline{\Delta R}\} = \begin{bmatrix} 1 & 0 & & 0 \\ 0 & 1 & & \vdots \\ & & \ddots & 0 \\ 0 & \cdots & 0 & 1 \end{bmatrix} \cdot \sigma_R^2 \quad (11)$$

whereby the formula for the variance above can be re-written as $$\begin{bmatrix} \sigma_x^2 & \vdots & \vdots \\ \vdots & \sigma_y^2 & \vdots \\ \vdots & \vdots & \sigma_z^2 \end{bmatrix} = diag\{\underline{H}^T \underline{\underline{Q}}^{-1} \underline{H}\}^{-1} = \sigma_R^2 diag\{\underline{H}^T \underline{H}\}^{-1} \quad (12)$$

where $\sigma_x^2 = var\{\Delta x\}$, $\sigma_y^2 = \{\Delta y\}$ and $\sigma_z^2 = var\{\Delta z\}$. This in turn can be further re-written as $$\begin{bmatrix} \frac{\sigma_x^2}{\sigma_R^2} & \cdots & \cdots \\ \vdots & \frac{\sigma_y^2}{\sigma_R^2} & \vdots \\ \cdots & \cdots & \frac{\sigma_z^2}{\sigma_R^2} \end{bmatrix} = diag\{\underline{H}^T \underline{H}\}^{-1} \quad (13)$$

where the matrix H is known and the ratios $$\frac{\sigma_x^2}{\sigma_R^2}, \frac{\sigma_y^2}{\sigma_R^2} \text{ and } \frac{\sigma_z^2}{\sigma_R^2}$$

can be used for computing the dilution of precision (DOP) based on the following definitions:

$$HDOP = \frac{\sqrt{\sigma_x^2 + \sigma_y^2}}{\sigma_R}; \quad VDOP = \frac{\sqrt{\sigma_z^2}}{\sigma_R}; \quad PDOP = \frac{\sqrt{\sigma_x^2 + \sigma_y^2 + \sigma_z^2}}{\sigma_R} \quad (14)$$

One can easily note the DOP parameters are dimensionless and statistically relate the variance of the measurements of the absolute range with the variance of the location accuracy.

Subsequently, after computing the DOP values pixel-by-pixel by the mean of formula 14 in the area under investigation, in a block 114 the cost function pertaining to location services only is computed by resorting to a formula as follows $$f_{Cost\,LBS} = a(\text{average} < DOP >) + b(67\% < DOP >) + c(\min < DOP >) \quad (15)$$

where a, b and c are multiplying coefficients (that is the weights of the cost function) expressing a linear combination of DOP, its average, its 67 percentile value and the minimum value over the area under investigation.

In a subsequent block 115, the process evaluates the correspondence of the quality of service (jointly for voice services, data services and location base services) resulting from the planning process with respect to the desired QoS.

A possible implementation of the block 115 can be as follows.

A first sub block minimises the function (1) introduced in the foregoing by identifying the quality of service related to all of the voice, data, and location based services.

Subsequently, in another sub-block the level of quality of service is evaluated by comparing the respective cost functions as obtained before (see formula 16) and after (see formula 1) the joint planning process.

$$F_{cost} = F[f_{Cost}(\text{voice}), f_{Cost}(\text{data})] \quad (16)$$

On the other hand, the formula 5 is evaluated by setting the coefficients A, B and C at least twice. For instance in the joint cost function (1) assumes value:

$$A=10, B=5, C=1 \quad (17)$$

$$A=10, B=5, C=0 \quad (18)$$

The coefficient values highlighted in (18) turn the formula (5) into the $F_{cost}$ (16). Once evaluated the two mentioned $F_{cost}$ in the block 115 the process verifies the Qos of voice and data in the two cases: (17) and (18)

It is assumed that the overall quality of voice and data (17) shall not drop with respect one obtained with the introduction of LBS (18) or by means of a fixed threshold.

Once the minimisation process is completed and the quality of services is verified, a decision is taken in block 115 as to whether the process can be regarded as completed at the i-th iteration (that is if the optimum value of the joint cost function defined by formula 1 has been found). Alternatively, planning at block 112 is subject to review through block 116.

In the block 116, one or more base stations are located requiring an intervention to be effected in order to optimise (also) planning of location services. In the specific case, the base station considered is the newly added one. The coordinates of the antenna or radiating system associated to the base station to be used for re-planning are provided to the block 112. The position (location) of the antenna is provided by the module 1000.

Before evolving towards the subsequent steps of the process (namely the (i+1)-th step) in a block 200 the adjacent area to be planned is identified.

In the specific case, the impact of the new base station having been introduced on pre-existing network (that is in the adjacent areas selected by block 111) is investigated by completing the planning process.

In brief, the module 1000 provides some intermediate results on the joint quality of the services in order to yield a joint planning of the network:

Once decided the suitable positions of the new Node B (shown as dots in the FIG. 5) on the basis of precise requirements (site availability for example), blocks 113-114, the computer system calculate the joint cost function $F_c$.

At a first step the obtained result could not yield suitable values (FIGS. 6 and 7), block 115; then through the block 116 a new base station position should be computed.

On the other hand, only when the resulting cost function satisfies the searched optimum (FIG. 8), then the module 1000 could process the next step (i.e. in the case a new station have to be added in the network, or evaluates the joint cost function for the pre-selected adjacent areas).

Turning now to the module 2000 in FIG. 3 a first set of input data is represented by the network design 200 that must be checked in order to ascertain the compliance therewith of the actual network situation. Such actual situation may in fact be affected by some configurations of the radioelectric parameters being changed due to drift over time or as a consequence of unexpected phenomena such as rainstorms, human errors and so on. The design can be loaded into a computer system by the system operator (the data are available by the module 1000) or, optionally, directly by the module 1000 via a direct connection as shown in FIG. 1. In the specific example shown here, that portion of the network design is considered corresponding to the area affected by the introduction of a new radio site (e.g. a Node B in the UMTS network).

Additionally, the values of the parameters measured "in the field" and concerning the base stations subject to analysis are also taken into account. In the specific case of this example, those characterising in parameters are considered that are significant for the portion of the network design whose correct execution is to be checked.

The results considered in the foregoing are obtained in a sequence of logical blocks designated 211 to 218.

The first block designated 211 selects automatically the service scenario of the area concerned by the analysis project, i.e. the context wherein the services have to be provided. The service scenario depends on the degree of urbanisation and on the propagation model and is defined, for example, as urban A, urban B, suburban, rural and so on.

In a subsequent block 212, the method/methods for location are automatically selected for the purpose of analysis. The process that identifies the critical areas where the location services do not reach the expected quality of service varies depending on the location method used. Different environments have in fact a different impact on the measures used in the positioning process: as an example, urban and rural areas have different impairment on measurements since the former introduces a multipath impair too.

Under this viewpoint, the process in question is adapted to discriminate the effects of the variations of the network parameters with respect to the network design depending on the types of measurements that are used for location e.g. time measurements such as TA, EOTD, OTDOA, power measurements P or also additional data such as a Cell Identity (cell ID).

The meaning of the acronyms reported in the foregoing are well known to those skilled in the art and do not require a specific explanation here. On the basis of the results achieved in the block 211, the most accurate method for the scenario selected is identified.

Essentially, this most accurate method is the one that is most affected by the variations in the network parameters (for instance, in an accurate location environment, its reduction has a very strong effect on the quality of service).

In another block 213, the parameter or parameters of the network subjected to analysis are selected. A possible embodiment provides for automatically selecting the parameter(s) depending on the effect on the location based services. In practice, the parameters are listed starting from those that have a stronger effect on the network on the basis of the results achieved in the two blocks 211 and 212.

A block 214 represents the first synthesis step related to data, e.g. table 1 highlights per each reference scenario, the sensitivity of the basic location methods with respect the variation of few network parameters; in particular the date in the table are simulation results which consider a variation as:

High if a variation in the parameter value produces for example a variation in the accuracy of the positioning method at least of 50% (fifty percent) with respect to the reference value at the 67th percentile.

Medium if a variation in the parameter value produces for example a variation in the accuracy of the positioning method between 10% and 50% (ten and fifty percent) with respect to the reference value at the 67th percentile.

Low if a variation in the parameter value produces for example a variation in the accuracy of the positioning method under 10% (ten percent) with respect to the reference value at the 67th percentile.

TABLE 1

|  | POWER | | | OTD | | | Cell-ID + TA | | |
| --- | --- | --- | --- | --- | --- | --- | --- | --- | --- |
|  | Rural | Suburban | Urban A | Rural | Suburban | Urban A | Rural | Suburban | Urban A |
| Antenna tilt | High | High | Medium | Medium | Low | Low | Low | Low | Low |
| Antenna azimuth | High | Medium | Low | Low | Low | Low | Medium | Medium | Medium |
| Antenna height | Low | Low | Low | Low | Low | Low | Low | Low | Low |
| Base station synchronism | Low | Low | Low | High | Low | Low | Low | Low | Low |
| Base station position | Low | Low | Low | Medium | Low | Low | Medium | Medium | Medium |
| Base station height | Low | Low | Low | Low | Low | Low | Low | Low | Low |
| Receiver sensitivity lost | Low | Low | Low | Low | Low | Low | Low | Low | Low |
| Radioelettric parameters | High | High | Low | Low | Low | Low | Low | Low | Low |

In practice, once the area to be covered by investigation is selected, for all possible combinations of the results obtained in the previous three blocks (for each scenario, each kind of measurement and each parameter) the quality of location services is evaluated. A possible implementation is based on the criterion that considers availability of service (namely when the accuracy of the service is above a minimum threshold) as expressed by the following two formulas $$\text{Criterion1} \sum_{i=1}^{n} f_i (\text{Accuracy}) \quad n = \text{number of pixel} \qquad (19)$$

$$f_i = \begin{cases} \text{Accuracy}_i \leq \text{Accuracy}_{threshold} & fi = 0 \; \forall i \\ \text{Accuracy}_i > \text{Accuracy}_{threshold} & fi = 1 \; \forall i \end{cases} \qquad (20)$$

where accuracy threshold is defined as the minimum value of accuracy accepted. Account is also taken of the average accuracy e.g. of this latter $$\text{Criterion2} \sum_{i=1}^{n} \frac{\text{Accuracy}_1}{n} \quad n = \text{number of pixel} \qquad (21)$$

At this point a list of points in the network characterised by their quality of service is created. A possible implementation of this list is represented by $$Criterion_{LBS} = \left(\frac{Criterion1}{n}\right) \times \left(\frac{D}{Criterion2}\right) \quad (22)$$

$n$ = number of pixel where D is a normalization coefficient depending on the service scenario. For instance, in an urban area D can be equal to 200.

The quality of service is regarded as acceptable if the criterion is higher than or equal to 1. A suitable scale of the $Criterion_{LBS}$ could adopt as units the values: 0.2, 0.4, 0.6, 0.8, 1, 1.4, 1.2, 1.6 (FIG. 9).

In a further block 220, the results obtained are further processed to associate to each value of $Criterion_{LBS}$ a corresponding n-pla of input data (service scenario, location method and parameter measured).

The result obtained in block 214 can be also displayed for instance by means of a map (FIG. 9, the most critical areas in the picture have a dark colour) by indicating the discrete values of the criterion and highlighting the critical situations in the area under analysis.

A block 215 indicates that the process can be regarded as completed if (1) no critical areas were identified and (2) no interventions on the network parameters are desired.

A block 216 takes into account the situation where counter measures are intended to be applied. This way of proceeding requires that the "critical" areas in the network be identified first. A possible implementation of such a functional block identifies critical areas as those areas where the $Criterion_{LBS}$ is less than 1.

By taking into account the need of modifying the results of the previous blocks (as related to the critical areas) a block 217 provides the possibility for an external operator to act on the critical areas previously located. In that way for instance, only those areas covered by the offer of location services may be selected and/or other areas may be added following indications provided by the network operator (for instance with values of $Criterion_{LBS}$ different from 1). If the external operator doesn't act on the system than it evolves towards step or block 230.

Finally, in a block 218, if the network operator intervenes in the process of defining the critical areas of the network, a new set of critical areas is defined including totally or partly those determined automatically by the module 2000 with the addition of those designated by the operator.

The block designated 230 processes all the data defined in the previous steps according to an order established based on the service scenario, the location method and the network parameters (see the blocks designated 211 to 214) starting from those areas that are most critical for the quality of service of the location service (see the blocks 215-220).

For instance in the case of a rural scenario service and of a location method based on power measurements priority is to be given preferably to the antenna tilt and azimuth parameters as parameters requiring an intervention (table 1). Conversely, in the case of a rural scenario and a location method based on time measurements (for instance OTD measurements) intervention on the antenna tilt and synchronism of the base stations will be generally preferred (table 1).

In terms of practical embodiment, the module employed in the network design as shown in FIG. 3 under 2000 can be used with some modifications as a remote module in a client/server configuration. This arrangement, indicated by 3000 in FIG. 4 is to be preferred in those application areas that require certain activities to be rendered remote activities (for instance managing a mobile network and checking/certifying its quality).

To that end, the module 3000 according to the functional diagram of FIG. 4 is to be considered. There a number of inputs to the module 3000 can be identified.

A first input is comprised of a sub-set of the network design 310 that has to be checked in terms of correct implementation "in the field" by measuring any possible misalignments with respect to the real situation of the network (for instance some configurations of the radioelectric parameters may vary as a consequence of drift over time and unexpected events such as rainstorms and the like).

The design data can be loaded by the system operator since the data are available in the module 1000 or optionally, directly from the module itself via a direct link as shown in FIG. 1.

The parameters in the radio stations (for instance the BTS in a GSM network) represent other input parameters. In the specific case of this example those parameters are considered that characterise the portion of the network design whose quality is to be tested.

Analysis and deployments synthesis of the network design are achieved by means of a number of functional blocks.

A first block is designated 311: there, the additional data such as the service scenario and the location method are collected.

In a further block 312 a pre-validation of the measurements effected in the field is introduced. Since the remote unit has the purpose of performing a first synthesis of the location services quality, only those parameters are selected whose variation may have an impact on accuracy of the location once i) the location method used (for instance the power method) and ii) the reference scenario (for instance a rural area) are known.

Likewise, only those parameters are selected for which an appreciable difference has been checked between the network design and the measurements carried out in the field (for instance those measurements having a low degree of variation, such as one degree in the case of tilt, are discarded).

Reference 313 designates a block where the decision is taken to whether or not the module 3000 have to processe the inputs; in the positive case it proceedes as the module 2000 of FIG. 3; in the negative case it sends the pre-validated measurements out to the module 2000.

In the block 210 (see also FIG. 3) the network parameter measurements, optionally already pre-validated in a step 312, are sent to the remote computer system comprising the module 2000 for data system synthesis and for identifying critical areas as well as possible counter-measures needed for re-establishing the desired quality of service.

In this case, the module 2000 processes data over a portion of territory which is relatively large and comprises all those areas that can form the subject matter of analysis by means of remote client systems such as the ones built up on module 3000.

In a block 320, applying the processes of module 2000 leads to the two typical results of the complete system 2000 being made available locally without having to take into account the effects on the surrounding portions of the network. At this point data synthesis provides information on the critical areas included in the network portion that is subject to analysis.

Finally, in a block designated 330, the counter-measures to be adopted locally are identified.

Of course, without prejudice to the underlying principles of the invention, the details and embodiments may vary, also significantly, with respect to what has been described and shown, by way of example only, without departing from the scope of the invention as defined by the annexed claims.

The invention claimed is:

1. A method of planning a cellular communication network, implemented using a computer, comprising steps of:
defining a joint cost function to be optimized, the joint cost function being indicative of a quality of service of location-based services and at least one additional class of services rendered by the cellular communication network, the at least one additional class of services being selected from a group of voice services and data services; and
optimizing, by the computer, the joint cost function,
wherein said joint cost function is optimized by using as input data a location of at least one radiating system associated with one base station in said cellular communication network,
wherein the method is for planning the cellular communication network over a given area, the method further comprising:
subdividing said given area into sub-areas, one of said sub-areas corresponding to a destination sub-area of a new base station in said cellular communication network, the remaining sub-areas being expected to be affected by the introduction of said new base station;
planning said destination sub-area of the new base station also by evaluating effects on said remaining sub-areas; and
evaluating the quality of service resulting from said planning while ascertaining whether such a level of quality of service is satisfactory,
wherein, if said quality of service is found not to be satisfactory, the method further comprises a step of re-planning a position of at least one radiating system associated with one base station in said cellular communication network.

2. The method of claim 1, wherein said joint cost function is based on measuring a dilution of precision of said cellular communication network.

3. The method of claim 1, comprising steps of:
providing a measurement system for measuring at least one actual network parameter; and
comparing measurements provided by said measurement system with corresponding parameters as planned.

4. The method of claim 3, comprising steps of:
providing a set of network design parameters;
obtaining from said measurement system a set of measurements corresponding to said set of design parameters; and
locating at least one critical area wherein the quality of service of said location services fails to reach an expected quality of service level as a result of said set of measurements failing to comply with said set of network design parameters.

5. The method of claim 4, comprising steps of:
selecting a service scenario; and
selecting at least one location system as the one most affected by variations in network parameters being anlayzed.

6. The method of claim 4, comprising a step of providing a list of points in the cellular communication network characterized by their quality of service.

7. The method of claim 4, comprising steps of generating and displaying a map of critical points in the area under analysis.

8. The method of claim 1, comprising a step of locating at least one critical point in the cellular communication network where inadequate quality of service is being provided.

9. The method of claim 8, comprising a step of generating information items indicative of counter measures to be carried out in said cellular communication network in order to dispense with at least one critical point.

10. The method of claim 1, wherein said planning involves computing a point-by-point value of dilution of precision for all pixels in the area subject to planning.

11. The method of claim 10, wherein said planning involves computing a cost function pertaining to location services only, said cost function being a linear combination of said dilution of precision and average and minimum values thereof.

12. The method of claim 1, comprising a step of optimizing a cost function for voice, data and location services.

13. The method of claim 1, wherein said at least one radiating system whose position is re-planned associated with one base station is a radiating system associated with said new base station.

14. The method of claim 1, comprising a step of providing a remote deployment module arranged for operating on a sub-set of the cellular communication network subject to planning.

15. The method of claim 14, comprising steps of configuring said remote deployment module for collecting local network data, pre-validating such measurements and either comparing said measurements with corresponding planning data of a network design sub-set or sending such measurements to a remote module for further processing.

16. A cellular communication network comprising at least one processing module for implementing the planning method of claim 1.

17. A nontransitory computer readable medium encoded with a computer program product loadable into a memory of a computer and including software code portions for performing the steps of the method of claim 1.

* * * * *